(12) United States Patent
Reese et al.

(10) Patent No.: US 9,881,300 B2
(45) Date of Patent: Jan. 30, 2018

(54) TECHNOLOGIES FOR SPLIT KEY SECURITY

(71) Applicant: Intel Corporation, Santa Clara, CA (US)

(72) Inventors: Kenneth W. Reese, Portland, OR (US); Raviprakash Nagaraj, Tigard, OR (US); Leonard Goodell, Albuquerque, NM (US); James L. Fafrak, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 14/670,871

(22) Filed: Mar. 27, 2015

(65) Prior Publication Data

US 2016/0283937 A1   Sep. 29, 2016

(51) Int. Cl.
| | |
|---|---|
| *H04L 29/00* | (2006.01) |
| *G06Q 20/38* | (2012.01) |
| *G06Q 20/40* | (2012.01) |
| *G06F 21/86* | (2013.01) |
| *G06F 21/53* | (2013.01) |
| *G06F 21/60* | (2013.01) |
| *H04L 29/06* | (2006.01) |
| *H04L 9/08* | (2006.01) |

(52) U.S. Cl.
CPC ......... *G06Q 20/3829* (2013.01); *G06F 21/53* (2013.01); *G06F 21/602* (2013.01); *G06F 21/86* (2013.01); *G06Q 20/4012* (2013.01); *H04L 9/0822* (2013.01); *H04L 9/0866* (2013.01); *H04L 9/0894* (2013.01); *H04L 63/0853* (2013.01); *G06F 2221/2107* (2013.01); *G06F 2221/2143* (2013.01); *G06Q 2220/00* (2013.01); *H04L 2209/56* (2013.01); *H04L 2463/062* (2013.01); *H04L 2463/102* (2013.01)

(58) Field of Classification Search
CPC ............... G06Q 20/3829; G06Q 20/40; G06Q 20/3823; G06Q 20/382; G06Q 20/4012; G06Q 20/12; G06Q 20/367; G06Q 20/085; G06Q 20/20; G06Q 20/3674; G06Q 20/401; G06Q 20/14; G06Q 20/409
See application file for complete search history.

(56) References Cited

U.S. PATENT DOCUMENTS

| | | | | |
|---|---|---|---|---|
| 5,022,076 | A | * | 6/1991 | Rosenow ............ G06F 11/0757 380/2 |
| 5,175,766 | A | * | 12/1992 | Hamilton ............ G06F 21/6245 705/64 |
| 2011/0178933 | A1 | * | 7/2011 | Bailey, Jr. ............. G06F 21/564 705/71 |

* cited by examiner

*Primary Examiner* — Ghazal Shehni
(74) *Attorney, Agent, or Firm* — Barnes & Thornburg LLP

(57) ABSTRACT

Technologies for split key security include a payment device to generate a key encryption key and a first key encryption key part. The payment device generates a second key encryption key part based on the key encryption key and the first key encryption key part and deletes the key encryption key in response to generating the second key encryption key part. Further, the payment device stores the first key encryption key part to a secure memory of a security co-processor of the payment device and the second key encryption key part to a secure memory of a secondary processor of the payment device. The secondary processor is electrically coupled to a backup energy source.

25 Claims, 7 Drawing Sheets

TECHNOLOGIES FOR SPLIT KEY SECURITY

BACKGROUND

The payment card industry has developed extremely prescriptive restrictions and guidance regarding how payment devices are to react in the event of suspected tampering. For example, one of the more critical rules states that the cryptographic keys used to perform personal identification number (PIN) encryption and payment data encryption must be automatically and immediately erased following the detection of a tampering event.

Today's computational architectures generally include a single processor with integrated circuitry configured to meet the payment card industry standards related to tamper detection and automated, immediate erasure of sensitive data. Further, due to the single processor nature of the architectures, they often require costly manual processes to initialize, update, and/or manage the various features and encryption keys used during normal operation of the payment device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
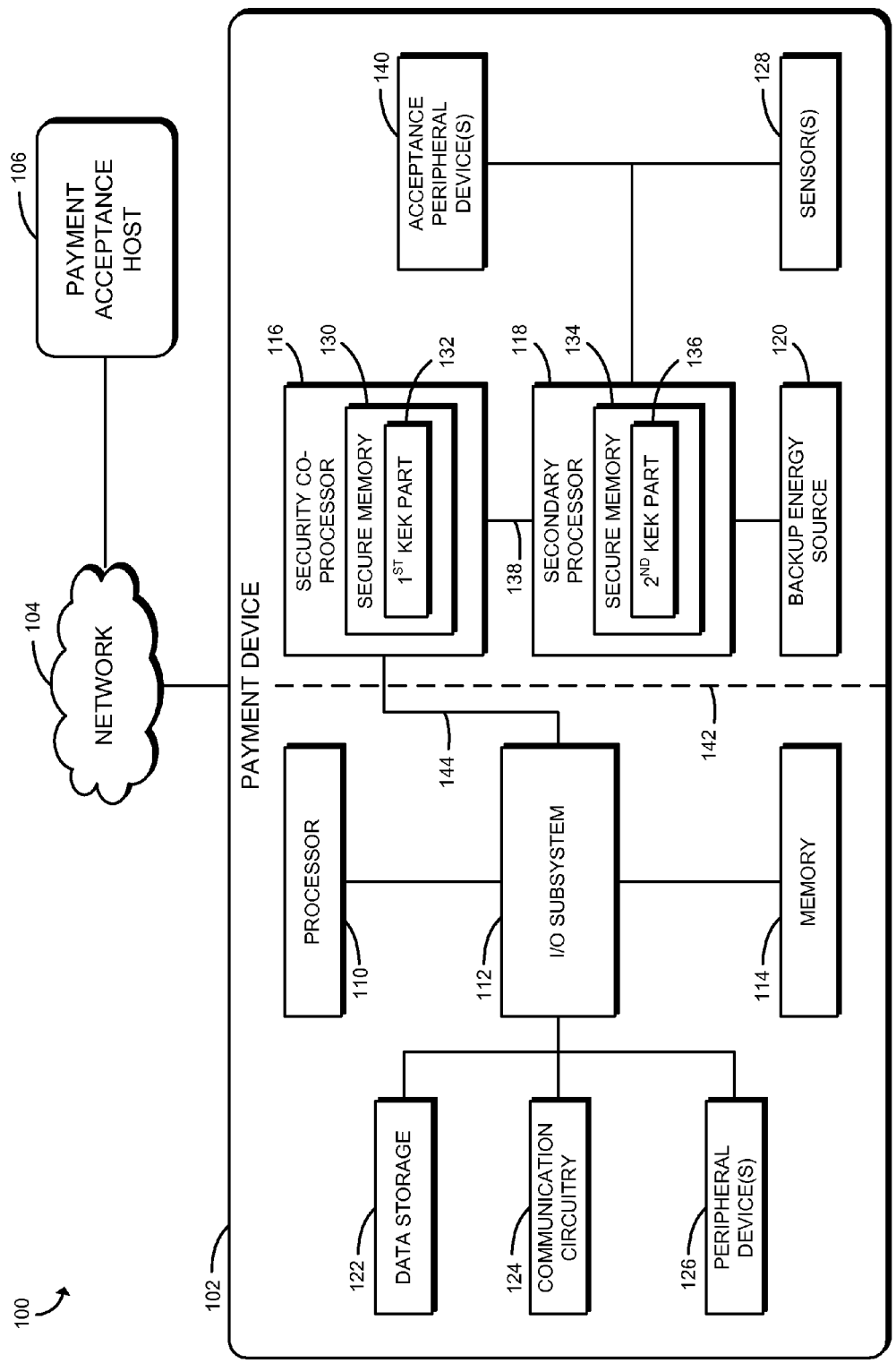
FIG. 1 is a simplified block diagram of at least one embodiment of a system for split key security.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for split key security includes a payment device 102, a network 104, and a payment acceptance host 106. Although only one payment device 102, one network 104, and one payment acceptance host 106 are illustratively shown in FIG. 1, the system 100 may include any number of payment devices 102, networks 104, and/or payment acceptance hosts 106 in other embodiments. For example, a particular payment device 102 may conduct PIN transactions with several different payment acceptance hosts 106 (e.g., different merchants) over one or more networks 104 in some embodiments.

As described in detail below, the system 100 allows the payment acceptance host 106 to benefit from over-the-air management while satisfying the prescriptive guidance of the payment card industry. In particular, the payment device 102 utilizes split-knowledge cryptographic keys distributed across distinct processing elements (e.g., a security co-processor 116 and a battery-maintained secondary processor 118) to permit secure/encrypted communication with the payment acceptance host 106 and immediate key erasure upon detection of a tamper event. In some embodiments, a first one of the processing elements includes aggregate device management protocols and authentication keys and is active only during active payment acquisition and/or interactive device management. Further, in some embodiments, the first processing element (e.g., the security co-processor 116) meets at least Evaluation Assurance Level (EAL) 5 and Federal Information Processing Standard (FIPS) 140-2 level 3/4 attack resistance requirements. The other processing element (e.g., the secondary processor 118) may be primarily active during the same periods described above but also maintain a split-knowledge key in a battery-maintained memory domain (e.g., RAM) that is immediately cleared upon detection of a tamper event (even when the device's primary power is not present) as described below.

The payment device 102 may be embodied as any type of computing device capable of performing the functions described herein. For example, the payment device 102 may be embodied as a smartphone, cellular phone, wearable computing device, personal digital assistant, mobile Internet device, smart device, tablet computer, notebook, netbook, Ultrabook™, desktop computer, server, router, switch, laptop computer, Hybrid device, and/or any other computing/communication device. As shown in FIG. 1, the illustrative payment device 102 includes a processor 110, an input/output ("I/O") subsystem 112, a memory 114, a security co-processor 116, a secondary processor 118, a backup energy source 120, a data storage 122, a communication circuitry 124, one or more peripheral devices 126, one or more sensors 128, and one or more acceptance peripheral devices 140. Of course, the payment device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the payment device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the payment device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the payment device 102, on a single integrated circuit chip.

The security co-processor 116 may be embodied as any hardware component(s) or circuitry capable of establishing a trusted execution environment and performing the functions described herein. In the illustrative embodiment, the security co-processor 116 is embodied as a tamper-proof secure element (e.g., in a smartcard). In particular, the security co-processor 116 (or, more particular, a secure element) may include key generation and containments systems that have been certified by relevant Federal Information Processing Standard (FIPS) and/or National Institute of Standards and Technology (NIST) standards to be secure for payment transactions. In some embodiments, the security co-processor 116 may be embodied as or otherwise utilize a Trusted Platform Module (TPM), a manageability engine (ME), an out-of-band processor, and/or an Intel® Software Guard Extensions (SGX) secure enclave. As shown in FIG. 1, the illustrative security co-processor 116 includes a secure memory 130. In some embodiments, the secure memory 130 may be embodied on the security co-processor 116 (e.g., as a secure partition of memory of the security co-processor 116), whereas in other embodiments, the secure memory 130 may be embodied or included on a separate hardware component accessible by the security co-processor 116 (e.g., accessible by only the security co-processor 116). As described herein, in the illustrative embodiment, the secure memory 130 stores a first key encryption key (KEK) part 132 of a key encryption key, encrypted PIN key(s), and/or other secure data.

The secondary processor 118 may be embodied as any hardware component(s) or circuitry capable of performing the functions described herein. It should be appreciated that, in the illustrative embodiment, the secondary processor 118 is embodied as a dedicated processor device for implementing tamper-monitoring functions that is separate from the security co-processor 116 and/or the main processor 110. In some embodiments, the secondary processor 118 may be embodied as an I/O processor device. As shown in FIG. 1, the illustrative secondary processor 118 includes a secure memory 134. In some embodiments, the secure memory 134 may be embodied on the secondary processor 118 (e.g., as a secure partition of memory of the secondary processor 118), whereas in other embodiments, the secure memory 134 may be embodied or included on a separate hardware component accessible by the secondary processor 118 (e.g., accessible by only the secondary processor 118). In the illustrative embodiment, the secure memory 134 stores a second KEK part 136 of the key encryption key and/or other secure data. Further, as described below, the first KEK part 132 and the second KEK part 136 are split keys that may be used to generate the key encryption key. It should be appreciated that, in some embodiments, the security co-processor 116 may communicate with the secondary processor 118 over a dedicated bus 138 between the security co-processor 116 and the secondary processor 118 (e.g., to retrieve the second KEK part 136 from the secondary processor 118).

In the illustrative embodiment, the secondary processor 118 is electrically coupled to a backup energy source 120. The backup energy source 120 may be embodied as any suitable energy source independent of the primary energy source(s) (e.g., power supply) of the payment device 102. For example, in some embodiments, the backup energy source 120 may be embodied as a battery that includes, for example, a battery-maintained register file that can be immediately cleared via an external signal.

The data storage 122 may be embodied as any type of device or devices configured for short-term or long-term storage of data such as, for example, memory devices and circuits, memory cards, hard disk drives, solid-state drives, or other data storage devices. The data storage 122 and/or the memory 114 may store various data during operation of the payment device 102 as described herein.

The communication circuitry 124 may be embodied as any communication circuit, device, or collection thereof, capable of enabling communications between the payment device 102 and other remote devices (e.g., the payment acceptance host 106) over the network 104. The communication circuitry 124 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 126 may include any number of additional peripheral or interface devices, such as speakers, microphones, additional storage devices, and so forth. The particular devices included in the peripheral devices 126 may depend on, for example, the type and/or intended use of the payment device 102.

In the illustrative embodiment, the sensors 128 generate sensor data based on the environment (e.g., hardware, firmware, and/or software environment) and/or context of the payment device 102. For example, as described below, the sensors 128 may generate sensor data that may be utilized by the payment device 102 (e.g., by the secondary processor 118) to determine whether a tamper event has occurred (e.g., by monitoring critical intrusion points, voltage, temperature, etc.). In various embodiments, the sensors 128 may be embodied as, or otherwise include, for example, inertial sensors, proximity sensors, optical sensors, light sensors, audio sensors, temperature sensors, motion sensors, piezo-electric sensors, pressure sensors, image sensors, software sensors, and/or other types of sensors that generate data useful to the payment device 102, which may vary depending on the particular purpose of the payment device 102. Of course, the payment device 102 may also include components and/or devices configured to facilitate the use of the sensors 128.

The acceptance peripheral devices 140 may be embodied as any type of device or devices capable of handling payment acceptance and/or otherwise performing the functions described herein. In some embodiments, the acceptance peripheral devices 140 may include one or more payment interfaces. For example, the acceptance peripheral devices 140 may include a magnetic stripe, contact-based payment circuitry (e.g., contact smart card), an EMV contact device (e.g., a device as specified in ISO 7816), a contactless smart card, an optical scanner, and/or other payment interfaces. Further, in some embodiments, the acceptance peripheral devices 140 may include near field communication (NFC) circuitry for short-range communication with remote devices (e.g., an NFC interface as specified in ISO 14443). In some embodiments, the acceptance peripheral devices 140, the sensors 128, and/or the secondary processor 118 establish a secondary I/O subsystem isolated from the I/O subsystem 112.

As shown, in some embodiments, a secure portion of the payment device 102 including the security co-processor 116, the secondary processor 118, the backup energy source 120, the sensors 128, and the acceptance peripheral devices 140 is isolated from other components of the payment device 102 (e.g., the processor 110, the I/O subsystem 112, the memory 114, the data storage 122, the communication circuitry 124, and/or the peripheral devices 126) by virtue of a physical security boundary 142. Further, in some embodiments, the security co-processor 116 may communicate with one or more of the components opposite the physical security boundary 142 over a restricted I/O path 144 that spans the physical security boundary 142. For example, in some embodiments, the restricted I/O path 144 is established between the I/O subsystem 112 and the security co-processor 116. It should be appreciated that, in some embodiments, one or more of the sensors 128 and/or the acceptance peripheral devices 140 may be communicatively coupled to the I/O subsystem 112 or otherwise established outside of the secure portion of the payment device 102 (e.g., on the opposite "side" of the physical security boundary 142).

The network 104 may be embodied as any type of communication network capable of facilitating communication between the payment device 102 and the payment acceptance host 106. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, an NFC link, or any combination thereof. It should be appreciated that, in some embodiments, the network 104 may be embodied as a physical bus or wire (e.g., a serial bus, Universal Serial Bus (USB), etc.).

The payment acceptance host 106 may be embodied as any computing device capable of performing the functions described herein. For example, the payment acceptance host 106 may be embodied as a transaction terminal, desktop computer, server, smart device, cellular phone, smartphone, wearable computing device, personal digital assistant, mobile Internet device, laptop computer, tablet computer, notebook, netbook, Ultrabook™, router, switch, Hybrid device, and/or any other computing/communication device. It should be appreciated that, in some embodiments, the payment acceptance host 106 may include one or more components similar to the components of the payment device 102 described above. As such, the description of those components is not repeated herein for clarity of the description. Of course, the payment acceptance host 106 may include other or additional components, such as those commonly found in a typical computing device (e.g., various input/output devices and/or other components) in some embodiments. Further, in some embodiments, one or more of the components of the payment device 102 may be omitted from the payment acceptance host 106 (e.g., the security co-processor 116, the secondary processor 118, and/or the sensors 128). It should be appreciated that, in some embodiments, the system 100 may include an intermediate "gateway" between the payment device 102 and the payment acceptance host 106. For example, in some embodiments, an intermediate "gateway" may aggregate data received from individual payment devices 102 for the payment acceptance host 106. In yet another embodiment, the payment acceptance host 106 may be embodied as an Internet-based device or service.

Figure 2:
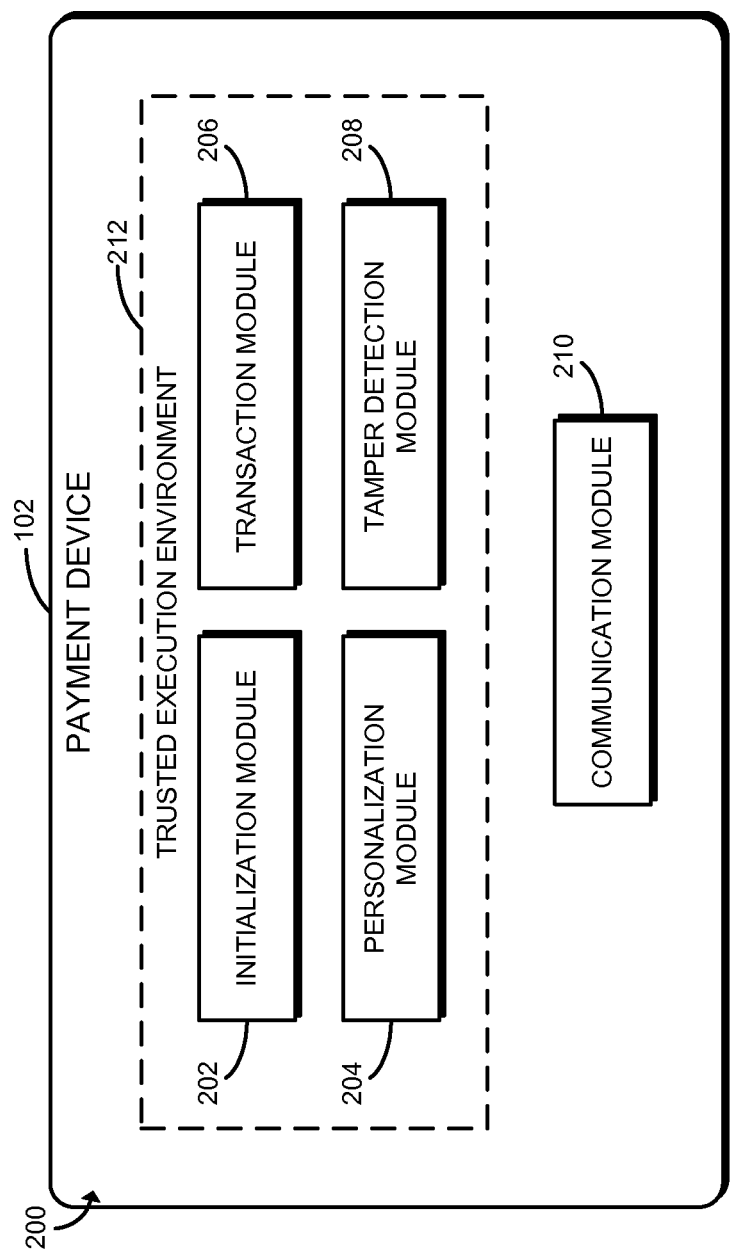
FIG. 2 is a simplified block diagram of at least one embodiment of an environment of a payment device of the system of FIG. 1.

Referring now to FIG. 2, in use, the payment device 102 establishes an environment 200 for split key security. The illustrative environment 200 of the payment device 102 includes an initialization module 202, a personalization module 204, a transaction module 206, a tamper detection module 208, and a communication module 210. Additionally, in some embodiments, one or more of the modules of the environment 200 may be embodied in or executed within a trusted execution environment 212. The various modules of the environment 200 may be embodied as hardware, software, firmware, or a combination thereof. For example, the various modules, logic, and other components of the environment 200 may form a portion of, or otherwise be established by, the processor 110 or other hardware components of the payment device 102. As such, in some embodiments, one or more of the modules of the environment 200 may be embodied as a circuit or collection of electrical devices (e.g., an initialization circuit, a personalization circuit, a transaction circuit, a tamper detection circuit, and/or a communication circuit). Additionally, in some embodiments, one or more of the illustrative modules may form a portion of another module.

It should be appreciated that, in some embodiments, the initialization module 202, the personalization module 204, and/or the transaction module 206 may perform the various cryptographic functions described herein. For example, the modules 202, 204, 206 may generate cryptographic keys, perform encryption/decryption, and/or perform other cryptographic functions. In other embodiments, the environment 200 may include an independent cryptographic module configured to handle the cryptographic functions of the payment device 102 and communicate with the various modules 202, 204, 206. It should be appreciated that, although encryption is described herein in reference to symmetric cryptography, asymmetric cryptography may be employed in other embodiments.

The initialization module 202 is configured to handle the generation and distribution of split/shared knowledge keys. In particular, as described below, the initialization module 202 generates a symmetric key encryption key (KEK) that may be used to encrypt and decrypt PIN keys used for PIN block encryption (i.e., PIN block encryption required to secure the transport of customer-entered PINs across system boundaries). It should be appreciated that the key encryption key may be generated based on any suitable cryptographic algorithm and/or key generation algorithm. As described below, knowledge of the key encryption key is diversified in that its parts can be stored in two separate elements, the security co-processor 116 and the secondary processor 118. In order to do so, the initialization module 202 generates a second cryptographic key (i.e., the first KEK part 132). Based on the key encryption key and the first KEK part 132, the initialization module 202 generates a third cryptographic key (i.e., the second KEK part 136). For example, the second KEK part 136 may be generated as an exclusive-or of the key encryption key and the first KEK part 132 (e.g., according to $KEK_2=KEK \oplus KEK_1$) or according to another involution. As discussed below, the payment device 102 may regenerate the key encryption key from the first and second KEK parts 132, 136. In the illustrative embodiment, the same function (e.g., exclusive-or or other involution) is utilized to generate the second KEK part 136 and to regenerate the key encryption key. In other embodiments, the second KEK part 136 may be generated by another type of invertible function and the key encryption key may be regenerated based on that function's inverse. The initialization module 202 deletes the key encryption key after generating the split keys (i.e., the first and second KEK parts 132, 136), stores the first KEK part 132 to the secure memory 130 of the security co-processor 116, and stores the second KEK part 136 to the secure memory 134 of the secondary processor 118. Of course, in other embodiments, the second KEK part 136 may be alternatively stored to the security co-processor 116 and the first KEK part 132 to the secondary processor 118.

The personalization module 204 is configured to handle the personalization of a PIN/payment encryption key of a merchant. In some embodiments, each payment device 102 must be personalized with a unique key (e.g., the key encryption key) so as to prevent a key-compromising event from creating a compromising condition in other payment devices 102 or payment acceptance hosts 106. During a key provisioning phase, a PIN encryption key is "injected" into the payment device 102 by an authorized agency (e.g., an agent of a particular merchant or bank). The personalization module 204 retrieves the first and second KEK parts 132, 136, regenerates the key encryption key, and encrypts the PIN encryption key with the key encryption key. In the illustrative embodiment, the personalization module 204 stores the encrypted PIN encryption key to the secure memory 130 of the security co-processor 116 and the unencrypted PIN encryption key and second KEK part 136 are deleted.

The transaction module 206 handles the performance of PIN/payment transactions by the payment device 102. In order to conduct a payment transaction, the encrypted PIN encryption key must be decrypted. Accordingly, the transaction module 206 regenerates the key encryption key based on the KEK parts 132, 136 and utilizes the key encryption key to decrypt the encrypted PIN encryption key. The transaction module 206 may utilize the PIN encryption key to encrypt a user of the payment device 102's PIN with the PIN encryption key and transmit the encrypted PIN to the payment acceptance host 106 (e.g., via the communication module 210). It should be appreciated that the transaction module 206 may delete the key encryption key, the second KEK part 136, and/or the decrypted PIN encrypted key after use.

The tamper detection module 208 monitors the payment device 102 for tampering. In doing so, the tamper detection module 208 may monitor and/or analyze data generated by the sensors 128 in some embodiments. It should be appreciated that, in the illustrative embodiment, the tamper detection module 208 forms a portion of or is executed by the secondary processor 118. In some embodiments, when a tamper condition has been detected, the tamper detection module 208 generates a tamper reset signal that erases content (entirely or in part) of the secure memory 134 of the secondary processor 118 (e.g., the second KEK part 136). As described above, in the illustrative embodiment, the secondary processor 118 is electrically coupled to the backup energy source 120 such that the secondary processor 118 is always powered (i.e., even when the payment device 102 is unpowered). Accordingly, it should be appreciated that the secondary processor 118 may immediately erase the second KEK part 136 upon detection of a tamper event and therefore render the key encryption key inoperable even when the payment device 102 is unpowered. When power is restored to the payment device 102, the secondary processor 118 may inform the security co-processor 116 of the tamper event such that any appropriate remedial actions may be performed. For example, the security co-processor 116 may delete all of the cryptographic keys stored in the secure memory 130.

The communication module 210 handles the communication between the payment device and remote devices (e.g., payment acceptance host 106) through the network 104. For example, as described herein, the communication module 210 transmits and receives messages to/from the payment acceptance host 106 associated with PIN transactions (e.g., transmission of a user's encrypted PIN).

Figure 3:
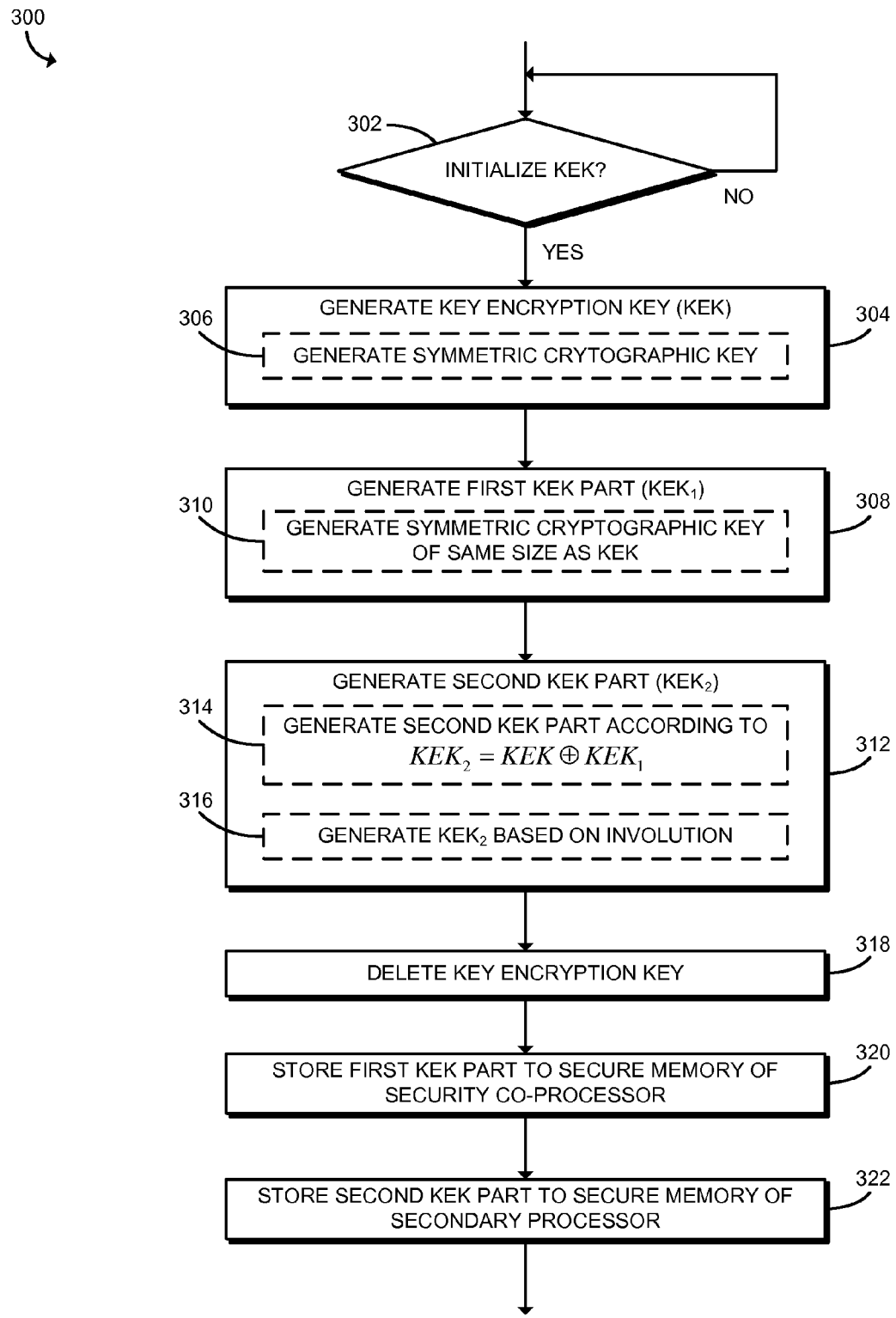
FIG. 3 is a simplified flow diagram of at least one embodiment of a method for initialing a key encryption key that may be executed by the payment device of FIG. 2.

Referring now to FIG. 3, in use, the payment device 102 may execute a method 300 for initialing a key encryption key. It should be appreciated that, in some embodiments, the method 300 may be executed by the security co-processor 116 (e.g., a secure element) of the payment device 102. The illustrative method 300 begins with block 302 in which the payment device 102 determines whether to initialize a key encryption key (KEK). If so, in block 304, the payment device 102 generates the key encryption key. In doing so, it should be appreciated that the payment device 102 may utilize any suitable cryptographic key generation algorithm. For example, the key encryption key may be generated utilizing a random key generation algorithm configured to generate a cryptographic key of a particular size (e.g., a particular number of bits). In particular, in block 306, the key encryption key may be generated as a symmetric cryptographic key. It should be appreciated that, in the illustrative embodiment, the key encryption key is "stronger" (e.g., has a larger number of bits) or at least at "strong" as the key(s) to be protected by the key encryption key (e.g., the PIN encryption keys of various merchants).

In block 308, the payment device 102 generates a first KEK part 132 ($KEK_1$) based on a suitable cryptographic key generation algorithm. In the illustrative embodiment, in block 310, the payment device 102 generates the first KEK part 132 as a symmetric cryptographic key of the same size (e.g., 128 bits) as the key encryption key. In some embodiments, the payment device 102 may generate the first KEK part 132 based on the same random key generation algorithm utilized to generate the key encryption key.

In block 312, the payment device 102 generates a second KEK part 136 ($KEK_2$) based on the key encryption key and the first KEK part 132. For example, in block 314, the payment device 102 may generate the second KEK part 136 based on an exclusive-or ($\oplus$) operation according to $KEK_2 = KEK \oplus KEK_1$. It should be appreciated that the exclusive-or operation is its own inverse such that applying it twice recovers the initial data (e.g., ($KEK \oplus KEK_1$) $\oplus KEK_1 = KEK$). In other embodiments, in block 316, the payment device 102 may generate the second KEK part 136 based on a different involution (i.e., a mathematical function that is its own inverse). Further, as described above, in yet other embodiments, the payment device 102 may utilize an invertible function and its inverse to generate the second KEK part 136 and recover the key encryption key, respectively. It should be appreciated that, in the illustrative embodiment, knowledge of either of the KEK parts 132, 136 reveals nothing about the other KEK part 132, 136.

In block 318, the payment device 102 deletes the originally generated key encryption key. In some embodiments, it should be appreciated that after the initial provisioning of the split keys (i.e., $KEK_1$ and $KEK_2$), the key encryption key is only temporarily stored on the payment device 102 during use (e.g., when encrypting or decrypting a PIN encryption key) and immediately deleted subsequent to use in order to maintain split key knowledge.

In block 320, the payment device 102 stores the first KEK part 132 to the secure memory 130 of the security co-processor 116. As indicated above, in some embodiments, the security co-processor 116 may be embodied as a secure element such that the first KEK part 132 is stored to secure memory of the secure element. In block 322, the payment device 102 stores the second KEK part 136 to the secure memory 134 of the secondary processor 118. In some embodiments, in doing so, the security co-processor 116 may communicate with the secondary processor 118 over a dedicated bus 138 established between the security co-processor 116 and the secondary processor 118. For example, the security co-processor 116 and the secondary processor 118 may execute a secure handshake protocol to establish a trusted relationship between the devices/components and communicate data (e.g., the second KEK part 136 and/or tamper detection signals) by virtue of the trusted relationship and/or dedicated bus 138. It should be appreciated that by distributing the KEK parts 132, 136 of the key encryption key, the payment device 102 establishes split key security.

Figure 4:
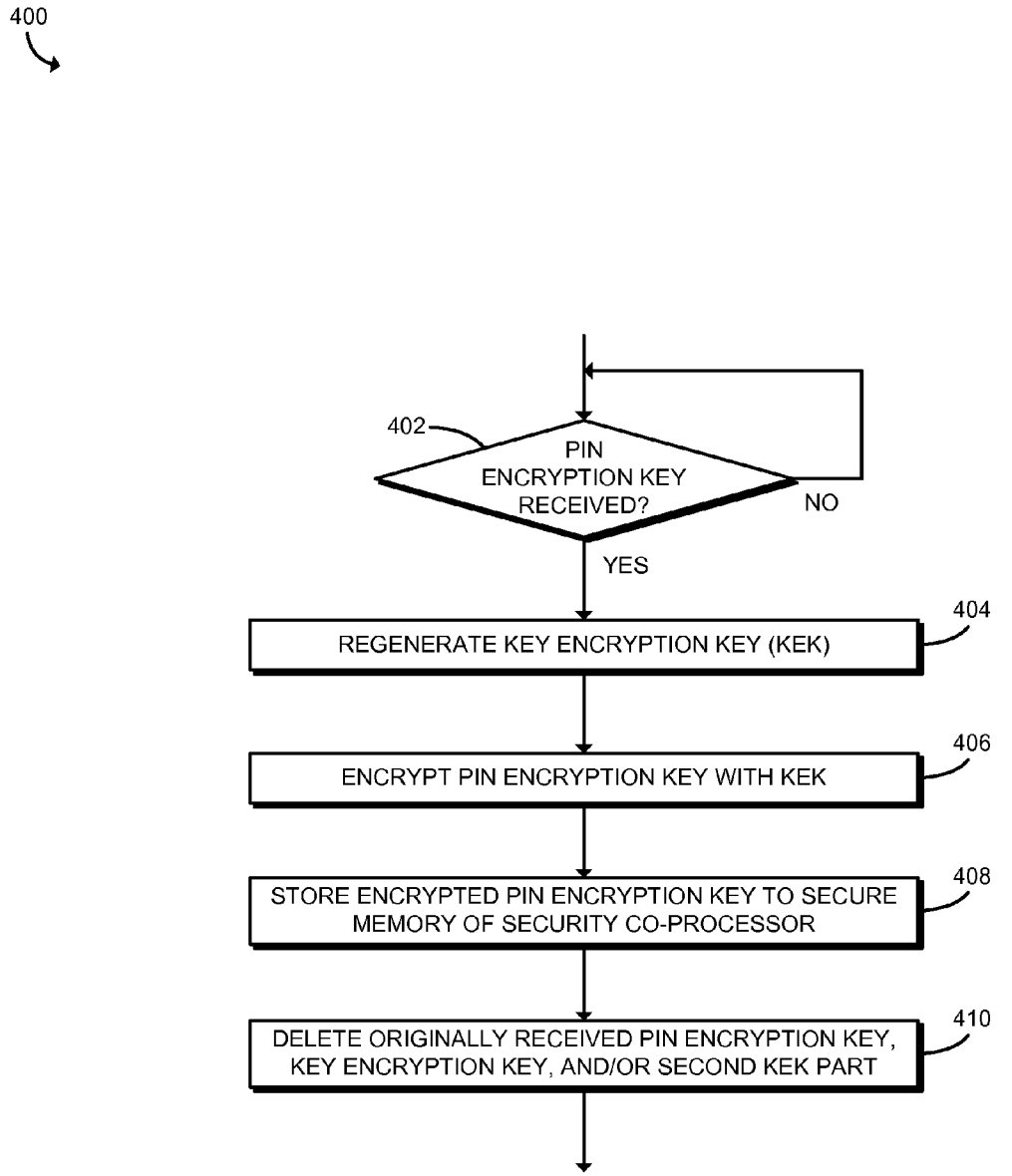
FIG. 4 is a simplified flow diagram of at least one embodiment of a method for PIN encryption key personalization that may be executed by the payment device of FIG. 2.

Referring now to FIG. 4, in use, the payment device 102 may execute a method 400 for PIN encryption key personalization. It should be appreciated that, in some embodiments, the method 400 may be executed by the security co-processor 116 (e.g., a secure element) of the payment device 102. The illustrative method 400 begins with block 402 in which the payment device 102 determines whether a PIN encryption key has been received from the payment acceptance host 106. It should be appreciated that, in some embodiments, prior to or contemporaneously with a payment acceptance host 106 (e.g., a transaction terminal) being deployed at a particular merchant, the payment acceptance host 106 transmits or otherwise conveys to the payment device 102 the particular PIN encryption key(s) to be used for securely transmitting a user's PIN from the payment device 102 to the payment acceptance host 106. Further, the payment acceptance host 106 may utilize an over-the-air update protocol to change the PIN encryption keys over time.

Figure 5:
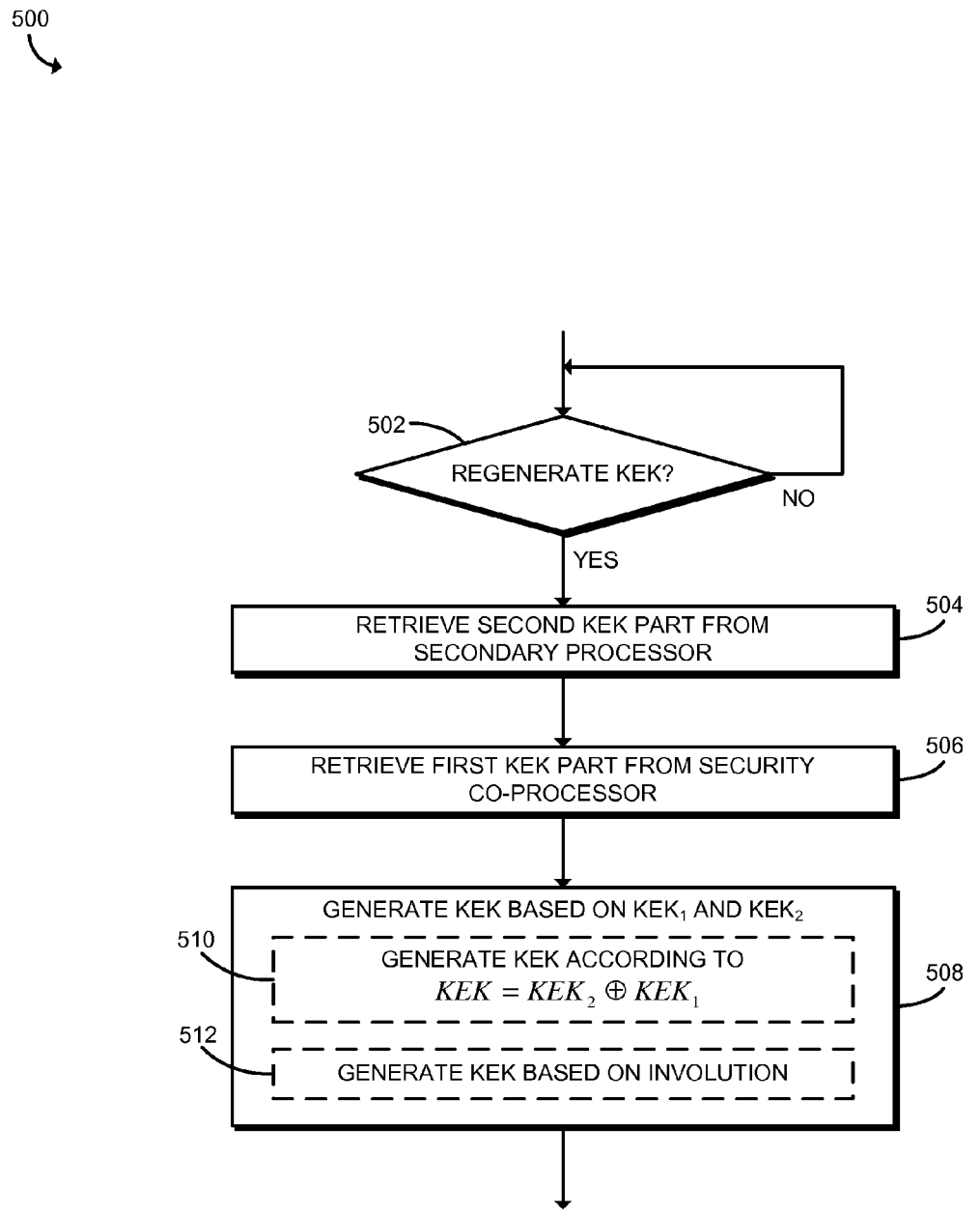
FIG. 5 is a simplified flow diagram of at least one embodiment of a method for regenerating a key encryption key that may be executed by the payment device of FIG. 2.

If the payment device 102 determines that a PIN encryption key has been received, the payment device 102 regenerates the key encryption key in block 404. To do so, the payment device 102 may execute a method 500 as described in reference to FIG. 5. It should be appreciated that, in some embodiments, the method 500 may be executed by the security co-processor 116 of the payment device 102. Referring now to FIG. 5, the illustrative method 500 begins with block 502 in which the payment device 102 determines whether to regenerate the key encryption key. If so, the payment device 102 retrieves the second KEK part 136 from the secure memory 134 of the secondary processor 118 in block 504. As indicated above, in doing so, the security co-processor 116 may request the second KEK part 136 from the secondary processor 118 over a dedicated bus 138 and/or by virtue of a trusted relationship established between the security co-processor 116 and the secondary processor 118. In block 506, the payment device 102 or, more particularly, the security co-processor 116 retrieves the first KEK part 132 from the secure memory 130 of the security co-processor 116.

In block 508, the payment device 102 (e.g., the security co-processor 116) generates the key encryption based on the first KEK part 132 and the second KEK part 136. In block 510, the payment device 102 may generate the key encryption key according to $KEK = KEK_2 \oplus KEK_1$, for example, in embodiments in which the second KEK part 136 was generated according to $KEK_2 = KEK \oplus KEK_1$. In other embodiments, in block 512, the payment device 102 may generate the key encryption key based on another involution (i.e., the involution that was utilized to generate the second KEK part 136). In other embodiments, the payment device 102 may regenerate the key encryption key according to another suitable algorithm, technique, and/or mechanism.

Returning to FIG. 4, the payment device 102 encrypts the PIN encryption key with the regenerated key encryption key in block 406. As indicated above, it should be appreciated that the payment device 102 may utilize any suitable cryptographic algorithm to encrypt the PIN encryption key. For example, in the illustrative embodiment, the payment device 102 encrypts the PIN encryption key with the key encryption key based on a symmetric cryptographic algorithm (e.g., two-key triple DES, AES, etc.). However, in other embodiments, the payment device 102 may encryption the PIN encryption key according to an asymmetric cryptographic algorithm that is consistent with the split key security techniques described herein.

In block 408, the payment device 102 stores the encrypted PIN encryption key to the secure memory 130 of the security co-processor 116. Of course, the encrypted PIN encryption key may be stored in another secure memory in other embodiments (e.g., a secure partition of the memory 114). In block 410, the payment device 102 or, more particularly, the security co-processor 116 deletes the originally received PIN encryption key (i.e., the unencrypted version of the PIN encryption key), the regenerated key encryption key, and/or the second KEK part 136 after use for security purposes. It should be appreciated that the payment device 102 may receive a PIN encryption key from multiple payment acceptance hosts 106 and, therefore may encrypt and store multiple PIN encryption keys in some embodiments.

Figure 6:
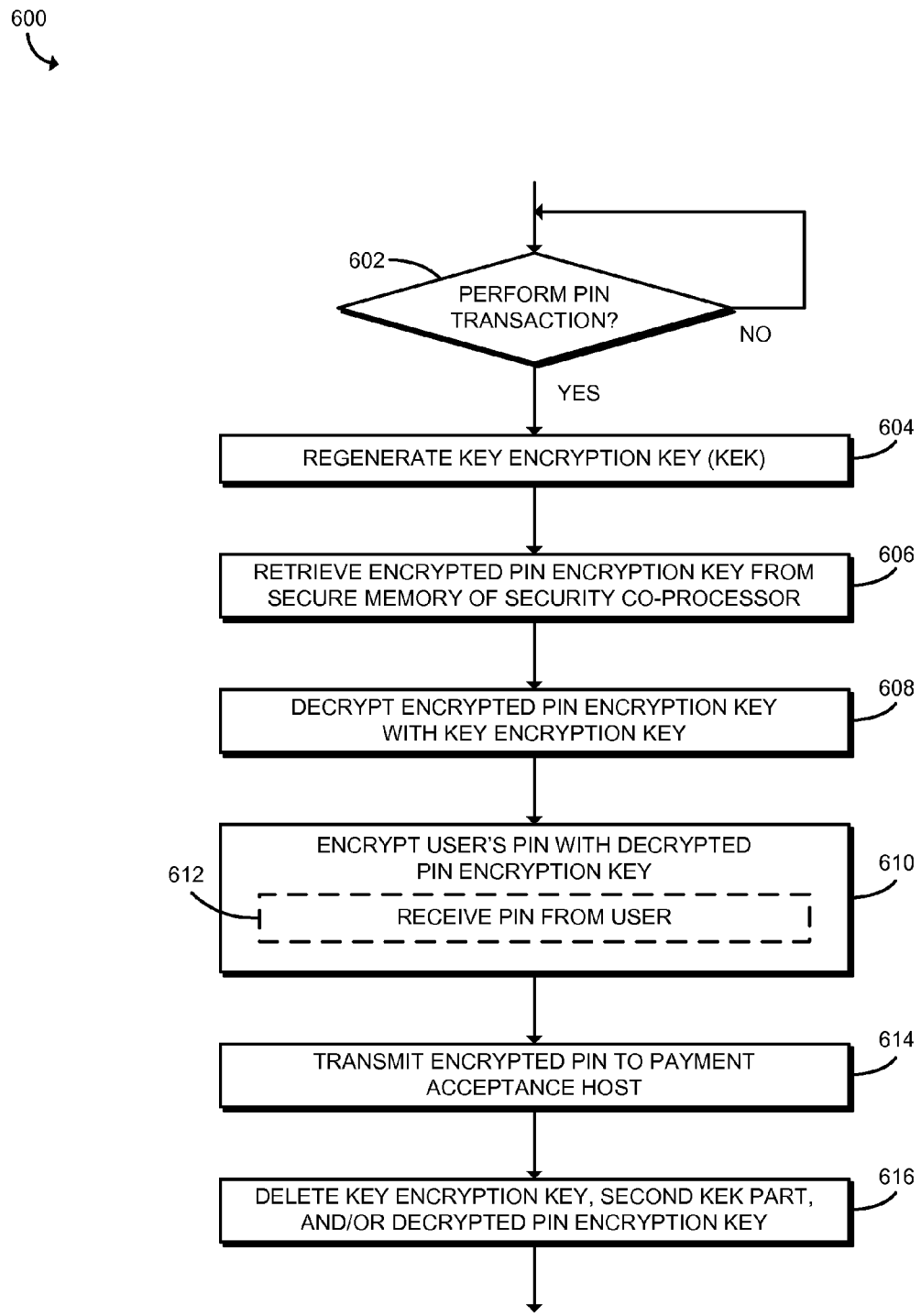
FIG. 6 is a simplified flow diagram of at least one embodiment of a method for performing a PIN transaction that may be executed by the payment device of FIG. 2.

Referring now to FIG. 6, in use, the payment device 102 may execute a method 600 for performing a PIN transaction. It should be appreciated that, in some embodiments, the method 600 may be executed by the security co-processor 116 (e.g., a secure element) of the payment device 102. The illustrative method 600 begins with block 602 in which the payment device 102 determines whether to perform a PIN transaction. For example, the payment device 102 may determine that it must encrypt a PIN block associated with a user's PIN for transmittal to the payment acceptance host 106 in order to complete a transaction. If so, the payment device 102 regenerates the key encryption key in block 604. To do so, the payment device 102 may execute the method 500 of FIG. 5 as described above. In other embodiments, the payment device 102 may regenerate the key encryption key according to another suitable algorithm, technique, and/or mechanism.

In block 606, the payment device 102 retrieves the encrypted PIN encryption key from the secure memory 130 of the security co-processor 116 or other storage location (e.g., a secure partition of the memory 114) depending on the particular embodiment. In block 608, the payment device 102 decrypts the encrypted PIN encryption key with the key encryption key. As indicated above, in the illustrative embodiment, the key encryption key is a symmetric cryptographic algorithm. Accordingly, in such embodiments, the key encryption key serves as both the encryption key and the decryption key for the PIN encryption key.

In block 610, the payment device 102 encrypts the user's PIN or PIN block with the decrypted PIN encrypted key. In doing so, in block 612, the payment device 102 may receive the PIN from the user of the payment device 102. It should be appreciated that the payment device 102 may receive the user's PIN through any suitable mechanism. For example, in some embodiments, the user may transmit her PIN through a user interface of the payment device 102 (e.g., through an acceptance peripheral device 140 or a peripheral device 128 via a protected I/O path). In other embodiments, the user may authorize the payment device 102 to retrieve the user's PIN from a storage location to which the PIN was previously securely stored. In block 614, the payment device 102 transmits the encrypted PIN to the payment acceptance host 106 over the network 104. In block 616, the payment device 102 or, more particularly, the security co-processor 116 deletes the regenerated key encryption key, the second KEK part 136, and/or the decrypted PIN encryption key after use for security purposes.

Figure 7:
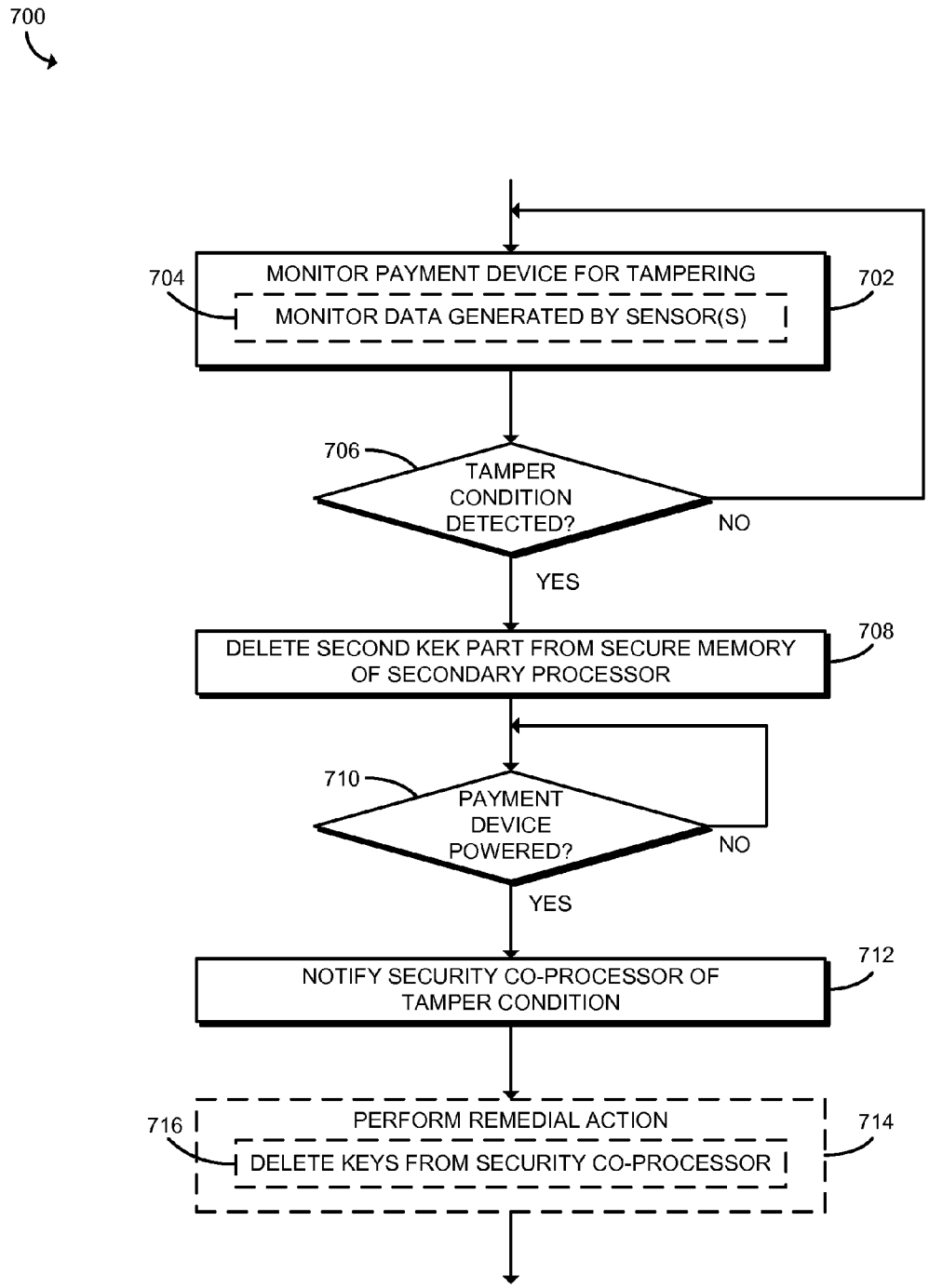
FIG. 7 is a simplified flow diagram of at least one embodiment of a method for monitoring the payment device of FIG. 2 for tampering.

Referring now to FIG. 7, in use, the payment device 102 may execute a method 700 for monitoring the payment device 102 for tampering. It should be appreciated that, in some embodiments, the method 700 may be generally executed by the secondary processor 118 of the payment device 102. The illustrative method 700 begins with block 702 in which the payment device 102 monitors the payment device 102 for tampering. In doing so, in block 704, the payment device 102 may monitor and/or analyze the data generated by one or more of the sensors 128 of the payment device 102. It should be appreciated that the particular conditions that constitute a tamper event may vary depending on the particular embodiment.

In block 706, the payment device 102 determines whether a tamper condition/event has been detected. If not, the payment device 102 continues to monitor the payment device 102 for tampering. However, if the payment device 102 determines that a tamper condition has been detected, the payment device 102 immediately deletes the second KEK part 136 from the secure memory 134 of the secondary processor 118 in block 708. As described above, in some embodiments, the second KEK part 136 may be stored in a battery-maintained register file that can be immediately cleared via a tamper signal. In the illustrative embodiment, the immediacy of a particular deletion may be defined according to Payment Card Industry PIN Transaction Security (PCI PTS) rules such as, for example, PCI PTS 4.0. As described above, the secondary processor 118 includes a backup energy source 120 and is therefore able to delete the second KEK part 136 regardless of the power state of the payment device 102, thereby making it effectively impossible to recover the key encryption key and rendering the encrypted PIN encryption key useless to an attacker.

In block 708, the payment device 102 determines whether the payment device 102 is powered. If so, the secondary processor 118 notifies the security co-processor 116 of the tamper condition in block 712. Otherwise, the payment device 102 waits until it is booted to inform the security co-processor 116 of the tamper event. In block 714, the payment device 102 or, more particularly, the security co-processor 116 may perform one or more remedial actions in response to the tamper condition. For example, in block 716, the security co-processor 116 may delete one or more cryptographic keys from the secure memory 130. In some embodiments, the security co-processor 116 or the payment device 102 generally may delete all cryptographic keys and/or sensitive data regardless of their encrypted or plaintext state in response to the tamper detection. Of course, the particular remedial actions may vary depending on the particular embodiment, the type of tamper event detected, the security level of the sensitive data or keys, and/or other characteristics.

EXAMPLES

Illustrative examples of the technologies disclosed herein are provided below. An embodiment of the technologies may include any one or more, and any combination of, the examples described below.

Example 1 includes a payment device for split key security, the payment device comprising a security co-processor; a backup energy source; a secondary processor electrically coupled to the backup energy source; and an initialization module to (i) generate a key encryption key and a first key encryption key part, (ii) generate a second key encryption key part based on the key encryption key and the first key encryption key part, (iii) delete the key encryption key in response to generation of the second key encryption key part, and (iv) store the first key encryption key part to a secure memory of the security co-processor and the second key encryption key part to a secure memory of the secondary processor.

Example 2 includes the subject matter of Example 1, and wherein the key encryption key comprises a symmetric cryptographic key.

Example 3 includes the subject matter of any of Examples 1 and 2, and wherein the first key encryption key part comprises a symmetric cryptographic key of a same number of bits as the key encryption key.

Example 4 includes the subject matter of any of Examples 1-3, and wherein to generate the second key encryption key part comprises to generate the second key encryption key part based on an involution.

Example 5 includes the subject matter of any of Examples 1-4, and wherein to generate the second key encryption key part comprises to generate the key encryption key part according to $KEK_2 = KEK \oplus KEK_1$, wherein $KEK_2$ is the second key encryption key part, KEK is the key encryption key, $KEK_1$ is the first key encryption key part, and $\oplus$ is a bitwise exclusive-or operation.

Example 6 includes the subject matter of any of Examples 1-5, and wherein the security co-processor comprises a smartcard secure element.

Example 7 includes the subject matter of any of Examples 1-6, and wherein the security co-processor comprises a manageability engine.

Example 8 includes the subject matter of any of Examples 1-7, and wherein the security co-processor is to establish a trusted execution environment.

Example 9 includes the subject matter of any of Examples 1-8, and further including a dedicated bus between the security co-processor and the secondary processor.

Example 10 includes the subject matter of any of Examples 1-9, and further including a personalization module to (i) regenerate the key encryption key based on the first key encryption key part and the second key encryption key part, (ii) encrypt a personal identification number (PIN) encryption key received from a payment acceptance host with the regenerated key encryption key, and (iii) store the encrypted PIN encryption key to the secure memory of the security co-processor.

Example 11 includes the subject matter of any of Examples 1-10, and wherein to store the encrypted PIN encryption key comprises to store the encryption PIN encryption key prior to deployment of the payment acceptance host at a merchant.

Example 12 includes the subject matter of any of Examples 1-11, and wherein to regenerate the key encryption key comprises to retrieve the second key encryption key part from the secure memory of the secondary processor; and retrieve the first key encryption key part from the secure memory of the security co-processor.

Example 13 includes the subject matter of any of Examples 1-12, and further including a dedicated bus between the security co-processor and the secondary processor, wherein to retrieve the second key encryption key part comprises to transmit a request, from the security co-processor and to the secondary processor, for the second key encryption key part over the dedicated bus.

Example 14 includes the subject matter of any of Examples 1-13, and wherein to regenerate the key encryption key comprises to generate the key encryption key based on an involution.

Example 15 includes the subject matter of any of Examples 1-14, and wherein to regenerate the key encryption key comprises to generate the key encryption key according to $KEK = KEK_2 \oplus KEK_1$, wherein KEK is the key encryption key, $KEK_2$ is the second key encryption key part, $KEK_1$ is the first key encryption key part, and $\oplus$ is a bitwise exclusive-or operation.

Example 16 includes the subject matter of any of Examples 1-15, and wherein the PIN encryption key comprises a first PIN encryption key associated with a first payment acceptance host; and wherein the personalization module is further to (i) encrypt a second PIN encryption key received from a second payment acceptance host with the regenerated key encryption key and (ii) store the encrypted second PIN encryption key to the secure memory of the security co-processor.

Example 17 includes the subject matter of any of Examples 1-16, and wherein the personalization module is further to delete, in response to storage of the encrypted PIN encryption key, the PIN encryption key received from the payment acceptance host, the regenerated key encryption key, and the second key encryption key part Example 18 includes the subject matter of any of Examples 1-17, and further including a transaction module to (i) regenerate the key encryption key based on the first key encryption key part and the second key encryption key part, (ii) retrieve the encrypted PIN encryption key from the secure memory of the security co-processor, (iii) decrypt the encrypted PIN encryption key with the regenerated key encryption key, (iv) encrypt a PIN of a user of the payment device with the decrypted PIN encryption key, and (v) transmit the encrypted PIN to the payment acceptance host.

Example 19 includes the subject matter of any of Examples 1-18, and wherein regenerating the key encryption key comprises generating the key encryption key according to $KEK = KEK_2 \oplus KEK_1$, wherein KEK is the key encryption key, $KEK_2$ is the second key encryption key part, $KEK_1$ is the first key encryption key part, and $\oplus$ is a bitwise exclusive-or operation.

Example 20 includes the subject matter of any of Examples 1-19, and wherein to encrypt the PIN comprises to encrypt the PIN in response to receipt of the PIN as user input of the user.

Example 21 includes the subject matter of any of Examples 1-20, and wherein the transaction module is further to delete, in response to transmittal of the encrypted PIN, the key encryption key, the second key encryption key part, and the decrypted PIN encryption key.

Example 22 includes the subject matter of any of Examples 1-21, and further including a tamper detection module to (i) monitor for a tamper condition indicative of tampering of the payment device, (ii) delete, by the secondary processor, the second key encryption key part from the secure memory of the secondary processor in response to detection of an occurrence of the tamper condition, and (iii) notify, by the secondary processor, the security co-processor of the occurrence of the tamper condition in response to deletion of the second key encryption key part and a determination that the payment device is powered.

Example 23 includes the subject matter of any of Examples 1-22, and wherein to monitor for the tamper condition comprises to monitor data generated by a sensor of the payment device.

Example 24 includes the subject matter of any of Examples 1-23, and wherein the tamper detection module is further to perform, by the security co-processor, a remedial action in response to receipt of a notification of the occurrence of the tamper condition.

Example 25 includes the subject matter of any of Examples 1-24, and wherein to perform the remedial action comprises to delete a cryptographic key from the secure memory of the security co-processor.

Example 26 includes the subject matter of any of Examples 1-25, and wherein to delete the second key encryption key part comprises to delete a battery-maintained register file of the secondary processor in response to a tamper reset signal generated based on the occurrence of the tamper condition.

Example 27 includes a method for split key security, the method comprising generating, by a payment device, a key encryption key and a first key encryption key part; generating, by the payment device, a second key encryption key part based on the key encryption key and the first key encryption key part; deleting, by the payment device, the key encryption key in response to generating the second key encryption key part; and storing, by the payment device, the first key encryption key part to a secure memory of a security co-processor of the payment device and the second key encryption key part to a secure memory of a secondary processor of the payment device, wherein the secondary processor is electrically coupled to a backup energy source.

Example 28 includes the subject matter of Example 27, and wherein generating the key encryption key comprises generating a symmetric cryptographic key.

Example 29 includes the subject matter of any of Examples 27 and 28, and wherein generating the first key encryption key part comprises generating a symmetric cryptographic key of a same number of bits as the key encryption key.

Example 30 includes the subject matter of any of Examples 27-29, and wherein generating the second key encryption key part comprises generating the second key encryption key part based on an involution.

Example 31 includes the subject matter of any of Examples 27-30, and wherein generating the second key encryption key part comprises generating the key encryption key part according to $KEK_2=KEK \oplus KEK_1$, wherein $KEK_2$ is the second key encryption key part, KEK is the key encryption key, $KEK_1$ is the first key encryption key part, and $\oplus$ is a bitwise exclusive-or operation.

Example 32 includes the subject matter of any of Examples 27-31, and wherein storing the first key encryption key part to the secure memory of the security co-processor comprises storing the first key encryption key part to a smartcard secure element.

Example 33 includes the subject matter of any of Examples 27-32, and wherein storing the first key encryption key part to the secure memory of the security co-processor comprises storing the first key encryption key part to a manageability engine.

Example 34 includes the subject matter of any of Examples 27-33, and further including establishing, by the security co-processor, a trusted execution environment.

Example 35 includes the subject matter of any of Examples 27-34, and wherein storing the second key encryption key part to the secure memory of the secondary processor comprises transmitting the second key encryption key part from the security co-processor to the secondary processor over a dedicated bus.

Example 36 includes the subject matter of any of Examples 27-35, and further including regenerating, by the payment device, the key encryption key based on the first key encryption key part and the second key encryption key part; encrypting, by the payment device, a personal identification number (PIN) encryption key received from a payment acceptance host with the regenerated key encryption key; and storing, by the payment device, the encrypted PIN encryption key to the secure memory of the security co-processor.

Example 37 includes the subject matter of any of Examples 27-36, and wherein storing the encrypted PIN encryption key comprises storing the encryption PIN encryption key prior to deployment of the payment acceptance host at a merchant.

Example 38 includes the subject matter of any of Examples 27-37, and wherein regenerating the key encryption key comprises retrieving the second key encryption key part from the secure memory of the secondary processor; and retrieving the first key encryption key part from the secure memory of the security co-processor.

Example 39 includes the subject matter of any of Examples 27-38, and wherein retrieving the second key encryption key part comprises transmitting a request, from the security co-processor and to the secondary processor, for the second key encryption key part over a dedicated bus between the security co-processor and the secondary processor.

Example 40 includes the subject matter of any of Examples 27-39, and wherein regenerating the key encryption key comprises generating the key encryption key based on an involution.

Example 41 includes the subject matter of any of Examples 27-40, and wherein regenerating the key encryption key comprises generating the key encryption key according to $KEK=KEK_2 \oplus KEK_1$, wherein KEK is the key encryption key, $KEK_2$ is the second key encryption key part, $KEK_1$ is the first key encryption key part, and $\oplus$ is a bitwise exclusive-or operation.

Example 42 includes the subject matter of any of Examples 27-41, and wherein the PIN encryption key comprises a first PIN encryption key associated with a first payment acceptance host, and further comprising encrypting, by the payment device, a second PIN encryption key received from a second payment acceptance host with the regenerated key encryption key; and storing, by the payment device, the encrypted second PIN encryption key to the secure memory of the security co-processor.

Example 43 includes the subject matter of any of Examples 27-42, and further including deleting, by the payment device and in response to storing the encrypted PIN encryption key, the PIN encryption key received from the payment acceptance host, the regenerated key encryption key, and the second key encryption key part Example 44 includes the subject matter of any of Examples 27-43, and further including regenerating, by the payment device, the key encryption key based on the first key encryption key part and the second key encryption key part; retrieving, by the payment device, the encrypted PIN encryption key from the secure memory of the security co-processor; decrypting, by the payment device, the encrypted PIN encryption key with the regenerated key encryption key; encrypting, by the payment device, a PIN of a user of the payment device with the decrypted PIN encryption key; and transmitting, by the payment device, the encrypted PIN to the payment acceptance host.

Example 45 includes the subject matter of any of Examples 27-44, and wherein regenerating the key encryption key comprises generating the key encryption key according to $KEK=KEK_2 \oplus KEK_1$, wherein KEK is the key encryption key, $KEK_2$ is the second key encryption key part, $KEK_1$ is the first key encryption key part, and $\oplus$ is a bitwise exclusive-or operation.

Example 46 includes the subject matter of any of Examples 27-45, and wherein encrypting the PIN comprises encrypting the PIN in response to receiving the PIN as user input of the user.

Example 47 includes the subject matter of any of Examples 27-46, and further including deleting, by the payment device and in response to transmitting the encrypted PIN, the key encryption key, the second key encryption key part, and the decrypted PIN encryption key.

Example 48 includes the subject matter of any of Examples 27-47, and further including monitoring, by the payment device, for a tamper condition indicative of tampering of the payment device; deleting, by the secondary processor of the payment device, the second key encryption key part from the secure memory of the secondary processor in response to detecting an occurrence of the tamper condition; and notifying, by the secondary processor of the payment device, the security co-processor of the occurrence of the tamper condition in response to deleting the second key encryption key part and determining that the payment device is powered.

Example 49 includes the subject matter of any of Examples 27-48, and wherein monitoring for the tamper condition comprises monitoring data generated by a sensor of the payment device.

Example 50 includes the subject matter of any of Examples 27-49, and further including performing, by the security co-processor of the payment device, a remedial action in response to receiving a notification of the occurrence of the tamper condition.

Example 51 includes the subject matter of any of Examples 27-50, and wherein performing the remedial action comprises deleting a cryptographic key from the secure memory of the security co-processor.

Example 52 includes the subject matter of any of Examples 27-51, and wherein deleting the second key encryption key part comprises deleting a battery-maintained register file of the secondary processor in response to a tamper reset signal generated based on the occurrence of the tamper condition.

Example 53 includes a computing device comprising a processor; and a memory having stored therein a plurality of instructions that when executed by the processor cause the computing device to perform the method of any of Examples 27-52.

Example 54 includes one or more machine-readable storage media comprising a plurality of instructions stored thereon that, in response to execution by a computing device, cause the computing device to perform the method of any of Examples 27-52.

Example 55 includes a payment device for split key security, the payment device comprising means for generating a key encryption key and a first key encryption key part; means for generating a second key encryption key part based on the key encryption key and the first key encryption key part; means for deleting the key encryption key in response to generating the second key encryption key part; and means for storing the first key encryption key part to a secure memory of a security co-processor of the payment device and the second key encryption key part to a secure memory of a secondary processor of the payment device, wherein the secondary processor is electrically coupled to a backup energy source.

Example 56 includes the subject matter of Example 55, and wherein the key encryption key comprises a symmetric cryptographic key.

Example 57 includes the subject matter of any of Examples 55 and 56, and wherein the first key encryption key part comprises a symmetric cryptographic key of a same number of bits as the key encryption key.

Example 58 includes the subject matter of any of Examples 55-57, and wherein the means for generating the second key encryption key part comprises means for generating the second key encryption key part based on an involution.

Example 59 includes the subject matter of any of Examples 55-58, and wherein the means for generating the second key encryption key part comprises means for generating the key encryption key part according to $KEK_2=KEK \oplus KEK_1$, wherein $KEK_2$ is the second key encryption key part, KEK is the key encryption key, $KEK_1$ is the first key encryption key part, and $\oplus$ is a bitwise exclusive-or operation.

Example 60 includes the subject matter of any of Examples 55-59, and wherein the means for storing the first key encryption key part to the secure memory of the security co-processor comprises means for storing the first key encryption key part to a smartcard secure element.

Example 61 includes the subject matter of any of Examples 55-60, and wherein the means for storing the first key encryption key part to the secure memory of the security co-processor comprises means for storing the first key encryption key part to a manageability engine.

Example 62 includes the subject matter of any of Examples 55-61, and further including means for establishing, by the security co-processor, a trusted execution environment.

Example 63 includes the subject matter of any of Examples 55-62, and wherein the means for storing the second key encryption key part to the secure memory of the secondary processor comprises means for transmitting the second key encryption key part from the security co-processor to the secondary processor over a dedicated bus.

Example 64 includes the subject matter of any of Examples 55-63, and further including means for regenerating the key encryption key based on the first key encryption key part and the second key encryption key part; means for encrypting a personal identification number (PIN) encryption key received from a payment acceptance host with the regenerated key encryption key; and means for storing the encrypted PIN encryption key to the secure memory of the security co-processor.

Example 65 includes the subject matter of any of Examples 55-64, and wherein the means for storing the encrypted PIN encryption key comprises means for storing the encryption PIN encryption key prior to deployment of the payment acceptance host at a merchant.

Example 66 includes the subject matter of any of Examples 55-65, and wherein the means for regenerating the key encryption key comprises means for retrieving the second key encryption key part from the secure memory of the secondary processor; and means for retrieving the first key encryption key part from the secure memory of the security co-processor.

Example 67 includes the subject matter of any of Examples 55-66, and, wherein the means for retrieving the second key encryption key part comprises means for transmitting a request, from the security co-processor and to the secondary processor, for the second key encryption key part over a dedicated bus between the security co-processor and the secondary processor.

Example 68 includes the subject matter of any of Examples 55-67, and wherein the means for regenerating the key encryption key comprises means for generating the key encryption key based on an involution.

Example 69 includes the subject matter of any of Examples 55-68, and wherein the means for regenerating the key encryption key comprises means for generating the key encryption key according to $KEK=KEK_2 \oplus KEK_1$, wherein KEK is the key encryption key, KEK$_2$ is the second key encryption key part, KEK$_1$ is the first key encryption key part, and $\oplus$ is a bitwise exclusive-or operation.

Example 70 includes the subject matter of any of Examples 55-69, and wherein the PIN encryption key comprises a first PIN encryption key associated with a first payment acceptance host, and further comprising means for encrypting a second PIN encryption key received from a second payment acceptance host with the regenerated key encryption key; and means for storing the encrypted second PIN encryption key to the secure memory of the security co-processor.

Example 71 includes the subject matter of any of Examples 55-70, and further including means for deleting, in response to storage of the encrypted PIN encryption key, the PIN encryption key received from the payment acceptance host, the regenerated key encryption key, and the second key encryption key part Example 72 includes the subject matter of any of Examples 55-71, and further including means for regenerating the key encryption key based on the first key encryption key part and the second key encryption key part; means for retrieving the encrypted PIN encryption key from the secure memory of the security co-processor; means for decrypting the encrypted PIN encryption key with the regenerated key encryption key; means for encrypting a PIN of a user of the payment device with the decrypted PIN encryption key; and means for transmitting the encrypted PIN to the payment acceptance host.

Example 73 includes the subject matter of any of Examples 55-72, and wherein the means for regenerating the key encryption key comprises means for generating the key encryption key according to KEK=KEK$_2 \oplus$KEK$_1$, wherein KEK is the key encryption key, KEK$_2$ is the second key encryption key part, KEK$_1$ is the first key encryption key part, and $\oplus$ is a bitwise exclusive-or operation.

Example 74 includes the subject matter of any of Examples 55-73, and wherein the means for encrypting the PIN comprises means for encrypting the PIN in response to receiving the PIN as user input of the user.

Example 75 includes the subject matter of any of Examples 55-74, and further including means for deleting, in response to transmitting the encrypted PIN, the key encryption key, the second key encryption key part, and the decrypted PIN encryption key.

Example 76 includes the subject matter of any of Examples 55-75, and further including means for monitoring for a tamper condition indicative of tampering of the payment device; means for deleting, by the secondary processor of the payment device, the second key encryption key part from the secure memory of the secondary processor in response to detection of an occurrence of the tamper condition; and means for notifying, by the secondary processor of the payment device, the security co-processor of the occurrence of the tamper condition in response to deleting the second key encryption key part and determining that the payment device is powered.

Example 77 includes the subject matter of any of Examples 55-76, and wherein the means for monitoring for the tamper condition comprises means for monitoring data generated by a sensor of the payment device.

Example 78 includes the subject matter of any of Examples 55-77, and further including means for performing, by the security co-processor of the payment device, a remedial action in response to receiving a notification of the occurrence of the tamper condition.

Example 79 includes the subject matter of any of Examples 55-78, and wherein the means for performing the remedial action comprises means for deleting a cryptographic key from the secure memory of the security co-processor.

Example 80 includes the subject matter of any of Examples 55-79, and wherein the means for deleting the second key encryption key part comprises means for deleting a battery-maintained register file of the secondary processor in response to a tamper reset signal generated based on the occurrence of the tamper condition.

The invention claimed is:

1. A payment device for split key security, the payment device comprising:
   a security co-processor;
   a backup energy source;
   a secondary processor electrically coupled to the backup energy source, wherein the secondary processor is different from the security co-processor; and
   an initialization module to (i) generate a key encryption key and a first key encryption key part, (ii) generate a second key encryption key part based on the key encryption key and the first key encryption key part, (iii) delete the key encryption key in response to generation of the second key encryption key part, and (iv) store the first key encryption key part to a secure memory of the security co-processor and the second key encryption key part to a secure memory of the secondary processor.

2. The payment device of claim 1, wherein the key encryption key comprises a symmetric cryptographic key; and
   wherein the first key encryption key part comprises a symmetric cryptographic key of a same number of bits as the key encryption key.

3. The payment device of claim 1, wherein to generate the second key encryption key part comprises to generate the second key encryption key part based on an involution.

4. The payment device of claim 1, wherein to generate the second key encryption key part comprises to generate the key encryption key part according to KEK$_2$=KEK$\oplus$KEK$_1$, wherein KEK$_2$ is the second key encryption key part, KEK is the key encryption key, KEK$_1$ is the first key encryption key part, and $\oplus$ is a bitwise exclusive-or operation.

5. The payment device of claim 1, wherein the security co-processor comprises a smartcard secure element.

6. The payment device of claim 1, further comprising a personalization module to (i) regenerate the key encryption key based on the first key encryption key part and the second key encryption key part, (ii) encrypt a personal identification number (PIN) encryption key received from a payment acceptance host with the regenerated key encryption key, and (iii) store the encrypted PIN encryption key to the secure memory of the security co-processor.

7. The payment device of claim 6, wherein to regenerate the key encryption key comprises to:
   retrieve the second key encryption key part from the secure memory of the secondary processor; and
   retrieve the first key encryption key part from the secure memory of the security co-processor.

8. The payment device of claim 7, further comprising a dedicated bus between the security co-processor and the secondary processor,
   wherein to retrieve the second key encryption key part comprises to transmit a request, from the security co-processor and to the secondary processor, for the second key encryption key part over the dedicated bus.

9. The payment device of claim 6, wherein to regenerate the key encryption key comprises to generate the key encryption key based on an involution.

10. The payment device of claim 6, wherein to regenerate the key encryption key comprises to generate the key encryption key according to $KEK=KEK_2 \oplus KEK_1$, wherein KEK is the key encryption key, $KEK_2$ is the second key encryption key part, $KEK_1$ is the first key encryption key part, and $\oplus$ is a bitwise exclusive-or operation.

11. The payment device of claim 6, wherein the PIN encryption key comprises a first PIN encryption key associated with a first payment acceptance host; and
wherein the personalization module is further to (i) encrypt a second PIN encryption key received from a second payment acceptance host with the regenerated key encryption key and (ii) store the encrypted second PIN encryption key to the secure memory of the security co-processor.

12. The payment device of claim 6, wherein the personalization module is further to delete, in response to storage of the encrypted PIN encryption key, the PIN encryption key received from the payment acceptance host, the regenerated key encryption key, and the second key encryption key part.

13. The payment device of claim 6, further comprising a transaction module to (i) regenerate the key encryption key based on the first key encryption key part and the second key encryption key part, (ii) retrieve the encrypted PIN encryption key from the secure memory of the security co-processor, (iii) decrypt the encrypted PIN encryption key with the regenerated key encryption key, (iv) encrypt a PIN of a user of the payment device with the decrypted PIN encryption key, and (v) transmit the encrypted PIN to the payment acceptance host.

14. The payment device of claim 13, wherein the transaction module is further to delete, in response to transmittal of the encrypted PIN, the key encryption key, the second key encryption key part, and the decrypted PIN encryption key.

15. One or more non-transitory, machine-readable storage media comprising a plurality of instructions stored thereon that, in response to execution by a payment device, cause the payment device to:
generate a key encryption key and a first key encryption key part;
generate a second key encryption key part based on the key encryption key and the first key encryption key part;
delete the key encryption key in response to generating the second key encryption key part; and
store the first key encryption key part to a secure memory of a security co-processor of the payment device and the second key encryption key part to a secure memory of a secondary processor of the payment device,
wherein the secondary processor is electrically coupled to a backup energy source and is different from the security co-processor.

16. The one or more non-transitory, machine-readable storage media of claim 15, wherein to generate the second key encryption key part comprises to generate the key encryption key part according to $KEK_2=KEK \oplus KEK_1$, wherein $KEK_2$ is the second key encryption key part, KEK is the key encryption key, $KEK_1$ is the first key encryption key part, and $\oplus$ is a bitwise exclusive-or operation.

17. The one or more non-transitory, machine-readable storage media of claim 15, wherein to store the second key encryption key part to the secure memory of the secondary processor comprises to transmit the second key encryption key part from the security co-processor to the secondary processor over a dedicated bus.

18. The one or more non-transitory, machine-readable storage media of claim 15, wherein the plurality of instructions further cause the payment device to:
regenerate the key encryption key based on the first key encryption key part and the second key encryption key part;
encrypt a personal identification number (PIN) encryption key received from a payment acceptance host with the regenerated key encryption key; and
store the encrypted PIN encryption key to the secure memory of the security co-processor.

19. The one or more non-transitory, machine-readable storage media of claim 18, wherein to store the encrypted PIN encryption key comprises to store the encryption PIN encryption key prior to deployment of the payment acceptance host at a merchant.

20. The one or more non-transitory, machine-readable storage media of claim 18, wherein the plurality of instructions further cause the payment device to:
regenerate the key encryption key based on the first key encryption key part and the second key encryption key part;
retrieve the encrypted PIN encryption key from the secure memory of the security co-processor;
decrypt the encrypted PIN encryption key with the regenerated key encryption key;
encrypt a PIN of a user of the payment device with the decrypted PIN encryption key; and
transmit the encrypted PIN to the payment acceptance host.

21. The one or more non-transitory, machine-readable storage media of claim 20, wherein to regenerate the key encryption key comprises to generate the key encryption key according to $KEK=KEK_2 \oplus KEK_1$, wherein KEK is the key encryption key, $KEK_2$ is the second key encryption key part, $KEK_1$ is the first key encryption key part, and $\oplus$ is a bitwise exclusive-or operation.

22. The one or more non-transitory, machine-readable storage media of claim 15, wherein the plurality of instructions further cause the payment device to:
monitor for a tamper condition indicative of tampering of the payment device;
delete, by the secondary processor of the payment device, the second key encryption key part from the secure memory of the secondary processor in response to detection of an occurrence of the tamper condition; and
notify, by the secondary processor of the payment device, the security co-processor of the occurrence of the tamper condition in response to a deletion of the second key encryption key part and a determination that the payment device is powered.

23. The one or more non-transitory, machine-readable storage media of claim 22, wherein the plurality of instructions further cause the payment device to perform, by the security co-processor of the payment device, a remedial action in response to receipt of a notification of the occurrence of the tamper condition, wherein the remedial action includes deletion of a cryptographic key from the secure memory of the security co-processor.

24. A method for split key security, the method comprising:
generating, by a payment device, a key encryption key and a first key encryption key part;

generating, by the payment device, a second key encryption key part based on the key encryption key and the first key encryption key part;

deleting, by the payment device, the key encryption key in response to generating the second key encryption key part; and storing, by the payment device, the first key encryption key part to a secure memory of a security co-processor of the payment device and the second key encryption key part to a secure memory of a secondary processor of the payment device, wherein the secondary processor is electrically coupled to a backup energy source and is different from the security co-processor.

25. The method of claim 24, wherein generating the second key encryption key part comprises generating the key encryption key part according to $KEK_2 = KEK \oplus KEK_1$, wherein $KEK_2$ is the second key encryption key part, $KEK$ is the key encryption key, $KEK_1$ is the first key encryption key part, and $\oplus$ is a bitwise exclusive-or operation.

* * * * *